United States Patent [19]
Beckwith

[11] Patent Number: 5,943,202
[45] Date of Patent: Aug. 24, 1999

[54] TWO WAY PACKET RADIO INCLUDING SMART DATA BUFFER AND PACKET RATE CONVERSION

[76] Inventor: Robert W. Beckwith, 2794 Camden Rd., Clearwater, Fla. 34619

[21] Appl. No.: 08/710,816

[22] Filed: Sep. 23, 1996

Related U.S. Application Data

[60] Provisional application No. 60/004,653, Oct. 2, 1995.

[51] Int. Cl.$^6$ ...................................................... H02H 3/00
[52] U.S. Cl. ................................ 361/66; 361/62; 361/93; 361/115; 361/119
[58] Field of Search .................................. 361/62, 64, 66, 361/115, 93, 42, 45, 119

[56] References Cited

U.S. PATENT DOCUMENTS

| | | | |
|---|---|---|---|
| 4,583,090 | 4/1986 | Eden | 340/825.07 |
| 5,309,310 | 5/1994 | Baer | 361/42 |

Primary Examiner—Stephen W. Jackson
Attorney, Agent, or Firm—Leo J. Aubel

[57] ABSTRACT

Intrinsically compressed device coded data is sent in radio packets with end use programs expanding the coded data for other purposes. Intelligent electronic devices are physically combined with radio communication mean to avert the coupling of interfering electromagnetic transients into the system processing and sending the data.

24 Claims, 5 Drawing Sheets

TWO WAY PACKET RADIO INCLUDING SMART DATA BUFFER AND PACKET RATE CONVERSION

This patent application claims the filing date of provisional patent application Ser. No. 60/004,653 of Robert W. Beckwith, filed on Oct. 2, 1995 and titled the same as above.

BACKGROUND OF INVENTION

It is desirable to use insulating communications means within an electric utility substation and at other locations in an electric utility system in order to safely cross over high voltage gradients that may exist either as a result of the high voltages continuously used by the utility or which result due to transient conditions. One communications media in use for this purpose is fiber optic cable. Another one, the subject of this invention, is two way packet radio; the term packet refers to non-continuous bursts of data of desired length. Two way packet radio systems have the advantage of lower cost and also the intrinsic value of providing two way communications between any two peers in a local system.

This invention will be more particularly described in its useful application to communications between SLIM devices. SLIM is an anachronism used by the inventor to describe a number of devices constructed and programmed as Synchronous LInear Machines and which use one or more of the following patents and patent applications.

REFERENCES TO RELATED APPLICATIONS

1) U.S. Pat. No. 5,315,527, METHOD AND APPARATUS PROVIDING HALF-CYCLE DIGITIZATION OF AC SIGNALS BY AN ANALOG-TO-DIGITAL CONVERTER, issued to Robert W. Beckwith, the inventor herein, which discloses apparatus and methods for sensing only positive half cycles of alternating current (AC) signals.

2) U.S. Pat. No. 5,544,064 titled APPARATUS AND METHOD FOR SAMPLING SIGNALS SYNCHRONOUS WITH ANALOG-TO-DIGITAL CONVERTER, issued to Robert W. Beckwith, the inventor herein, on Aug. 6, 1996 which discloses apparatus and methods useful in tapchanger controls for obtaining samples of an AC wave synchronous with a free running analog to digital converter (ADC).

3) U.S. Pat. No. 5,541,498 titled DISTRIBUTION CIRCUIT VAR MANAGEMENT USING ADAPTIVE CAPACITOR CONTROL, issued to Robert W. Beckwith, the inventor herein, on Jul. 30, 1996 which discloses apparatus and methods of using tapchanger control apparatus having a Var bias to beneficently influence the switching of adaptive capacitor controls (ACC's).

4) U.S. patent application Ser. No. 386,748, FIBER OPTIC TERMINATOR WITH ELECTRICAL INPUT/OUTPUT, filed by Robert W. Beckwith, the inventor herein, on Feb. 10, 1995 which discloses apparatus and methods for terminating bi-directional fiber optic cable so as to permit plugging into a socket on either end serving TTL logic levels.

5) U.S. Pat. No. 5,530,338 titled LOAD TAPCHANGER PARALLELING BY DAISY CHAIN OF LOAD CURRENTS, issued to Robert W. Beckwith, the inventor herein, on Jun. 25, 1996 which discloses apparatus and methods for paralleling tapchanging transformers and regulators by sensing the load current of a controlled unit together with the load current of the controlled unit next located around a ring of paralleled units.

6) U.S. patent application Ser. No. 421,378, A RADIAL DIGITAL SYSTEM USING A SMART HUB FOR RAPID BI-DIRECTIONAL COMMANDS, filed by Robert W. Beckwith, the inventer herein, on Apr. 13, 1995 which discloses apparatus and methods for combining a radial array of terminated fiber optic cables to a hub having computing and data direction handling capability so as to communicate between an external computer network using any selected protocol with units at the terminals of the array each having a primitive but high speed protocol.

7) U.S. patent application Ser. No. 493,423, A METHOD FOR OBTAINING THE FUNDAMENTAL AND ODD HARMONIC COMPONENTS OF AC SIGNALS, filed by Robert W. Beckwith, the inventer herein, on Jun. 19, 1995 which discloses methods for obtaining the fundamental component and odd harmonics of a half wave AC signal.

8) U.S. Pat. No. 5,646,512, titled MULTIFUNCTION ADAPTIVE CONTROLS FOR TAPSWITCHES AND CAPACITORS filed by Robert W. Beckwith, the inventer herein, on Aug. 15, 1996 discloses adaptive apparatus and methods combining the functions of tapchanger control, capacitor control, substation data monitoring and communications.

U.S. Pat. Nos. 5,315,527, 5,544,064, 5,541,498, 5,530,338, 5,614,292 and 5,773,366 and application Ser. No. 421,378 are incorporated herein by reference.

SUMMARY OF THE INVENTION

Raw data, efficient in operation of intelligent electronic devices (IED's), available in compressed binary packet form using a first time protocol is buffered in radios, and transmitted in highly efficient radio packets in a second time protocol compatible with the radio system. By inventively making the radios an integral part of IED's, the coupling of interfering transients into conductive loops is avoided. Program instruction are furnished for receiving the compressed raw data from the IED's and extracting expanded information for use external to the IED's.

The foregoing features and advantages of the present invention will be apparent from the following more particular description. The accompanying drawings, listed hereinbelow, are useful in explaining the invention.

BRIEF DESCRIPTIONS OF THE DRAWINGS

DESCRIPTION OF THE PREFERRED EMBODIMENTS

Figure 1:
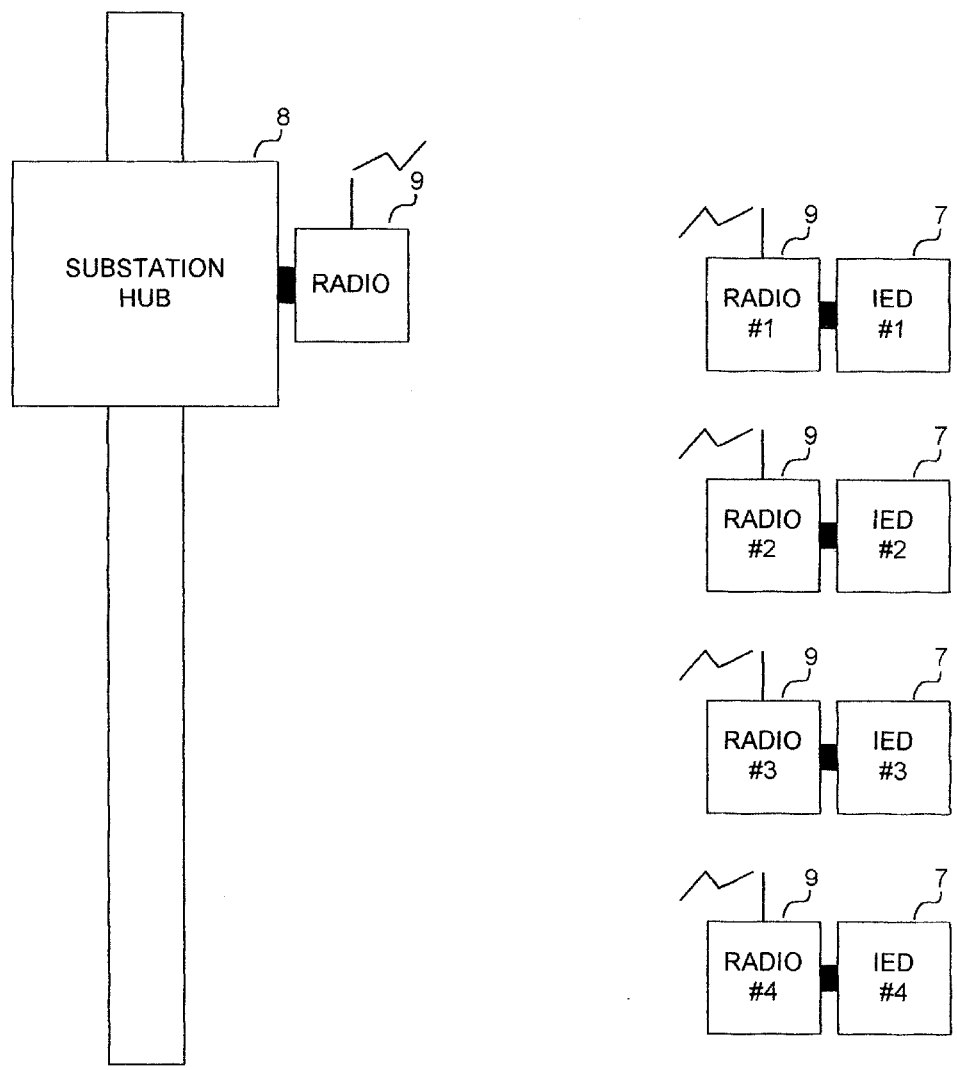
FIG. 1 shows a substation hub using smart radio communications with multiple IED's.

A tapchanging transformer control is typical of electric utility substation devices commonly known as intelligent electronic devices (IEDs). IEDs using the principles described in reference U.S. Pat. No. 5,544,064 titled "APPARATUS AND METHOD FOR SAMPLING SIGNALS SYNCHRONOUS WITH ANALOG-TO-DIGITAL CONVERTER", are further inventively used to produce data obtained by means of the measurement techniques disclosed in the SLIM technology as disclosed in the aforesaid patent. Such data is in intrinsically highly compressed binary coded form requiring no bits to identify portions of the data. Utilizing and improving on the above referenced invention, the present invention provides construction of "one thing at a time" programs using no interrupts and having the knowledge of the meaning of each bit of said highly compressed data incorporated in the structure of the program thus requiring no program bits to identify data.

IED's are thus simplified by directly using the intrinsically compressed binary raw data required for control and protection of electric power equipment. Having no word demarcation bits this data is "pure information" very efficiently made useable by the structure of the IED program. Reference U.S. Pat. No. 5,544,064 describes communications to and from the IED at a first time criterion synchronous with power frequency. In this invention, intrinsically compressed binary coded data from the IED is buffered in a radio and communicated in efficient packet form of minimal length to an end use point using a second time criterion compatible with the radio system. Only minimal error checking bits and packet identifying bits are added to the raw data bits thereby forming packets of minimal length for highly efficient transmission to a final destination. Program instructions are furnished at final destinations for extracting expanded information from the raw data useable for purposes other than the original IED control and protection. Note that the messages are meaningless binary strings totally secure from use by any unauthorized person not in possession of the required program instruction for the specific raw data. Need for security codes is eliminated, but can be used, if desired, for additional security.

Data is available from IED's in packet form at times convenient to the IED's with only a small amount of communications coding required in the IED's. This permits the messages to be sent in negative half cycles of AC waves without requiring additional time for the communications function.

This data is buffered and retransmitted in packets convenient to a radio system. This invention combines features of:

1. Physically combining the radio transmitter and the IED so as to eliminate conductive loops susceptible of picking up interfering signals.

2. Sending data as produced by IED's in intrinsically totally compacted binary form.

3. Buffering data so as to accommodate the incompatible data packet time requirements of IED's and packet radios.

4. Extracting expanded information useable for other purposes.

IED devices using this combination of invention typically may use a microprocessor having a clock rate of 1.84 megahertz and communicating via an asynchronous port at 115 kbaud. The microprocessor used contains internal means for making this frequency conversion. The nature of the synchronous linear program used in the devices is to perform one function at a time. Communications is one of these functions with a communications opportunity occurring typically 10 to 60 times per second. At these times, communications is by packets of data into or out of the microprocessor asynchronous port at the rate of 115 kbits per second (baud) within each packet. SLIM devices are unable to communicate at other times, therefore a buffer is required to accommodate the desired times of communications of equipment and networks external to the SLIM devices. This application discloses packet two-way radio communications between SLIM devices typically within an electric utility substation. Such two way radios commonly operate at 900 megahertz. Stated in another way, since the SLIM data packets occur at different times than the radio data packets, a buffer is required. Preferably this uses memory contained in the radio.

The SLIM devices are capable of providing a prodigious amount of data which must be reduced to information of interest other than the IED task of control and/or protection. This is done by a program useable at end use, or termination, points for the data. A typical example is data for determining electric watts and Vars demand. A demand is an integration of watts or Vars required during a time period, most typically 15 minutes. Prior art electro-mechanical demand meters, however, were slightly non-linear and electric utility charges for demand are based on the characteristics of one or another prior art demand meter. In prior digital art, the integration is accomplished mathematically using equations to duplicate the desired non-linearity.

FIG. 1 shows a substation hub 8 with radio 9 communications to controls or protective relays (collectively known in the trade as Intelligent Electronic Devices or IED's generally indicated as 7).

Figure 2:
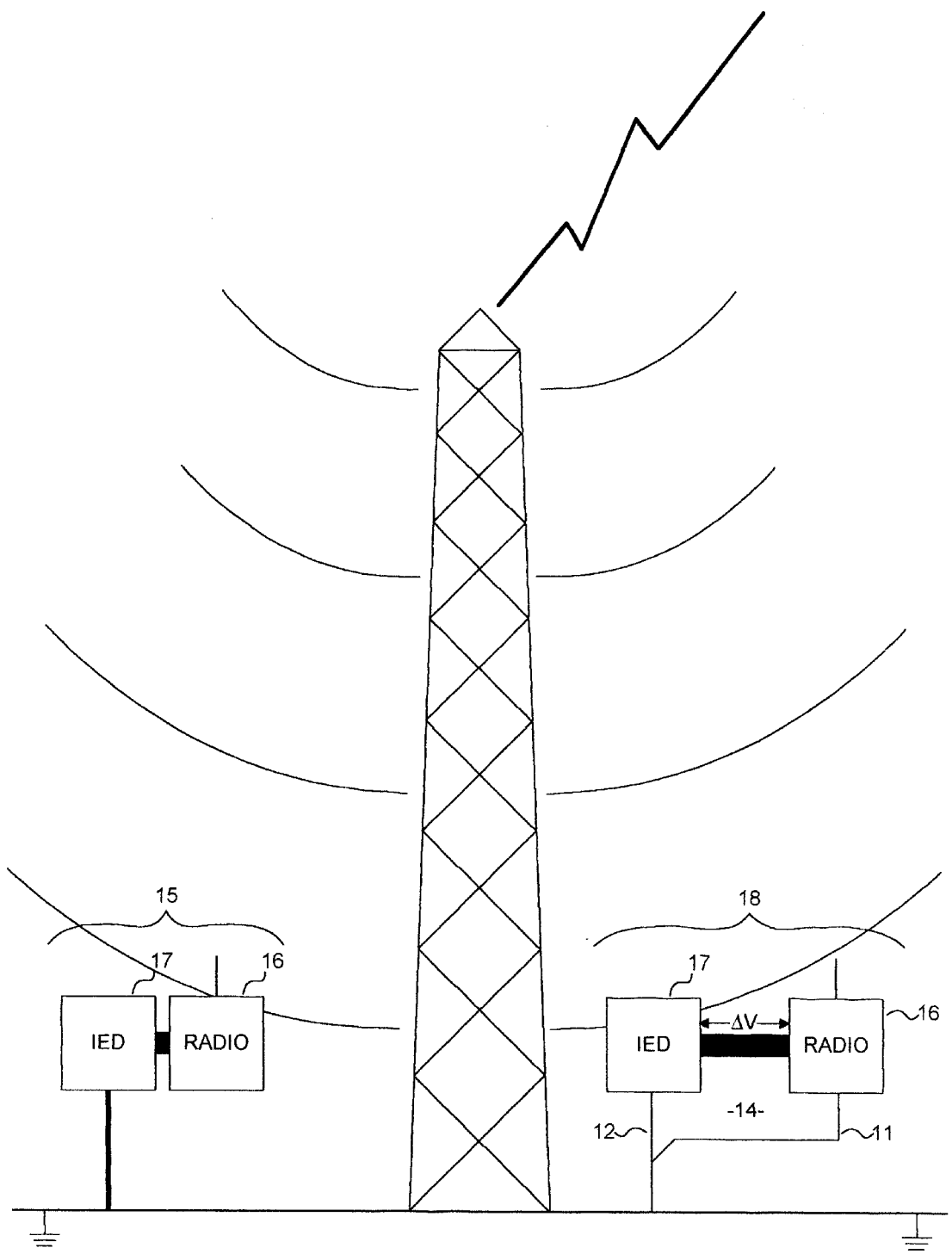
FIG. 2 shows a lightning strike to a substation producing interference to an IED connected in a loop to a radio as contrasted to an IED having a self contained radio device.

Prior art radios generally obtain power from a separate source from the device to which they obtain their communications circuits. FIG. 2 illustrates the path 12 from the IED's to a first power source and the radios 16 by path 11 to a second power source forming an undesirable loop 14 coupling an interfering voltage ▲v between the IED 17 and radio 16.

FIG. 2 compares the coupling of high frequency electrical transients into the loop of prior art equipment 18 to the freedom from coupling of the inventive equipment 15 having no loop. These transients may come as a result of a lightning strike to substation circuits, as shown in FIG. 2, or due to the opening of a high voltage disconnect switch.

Figure 3A:
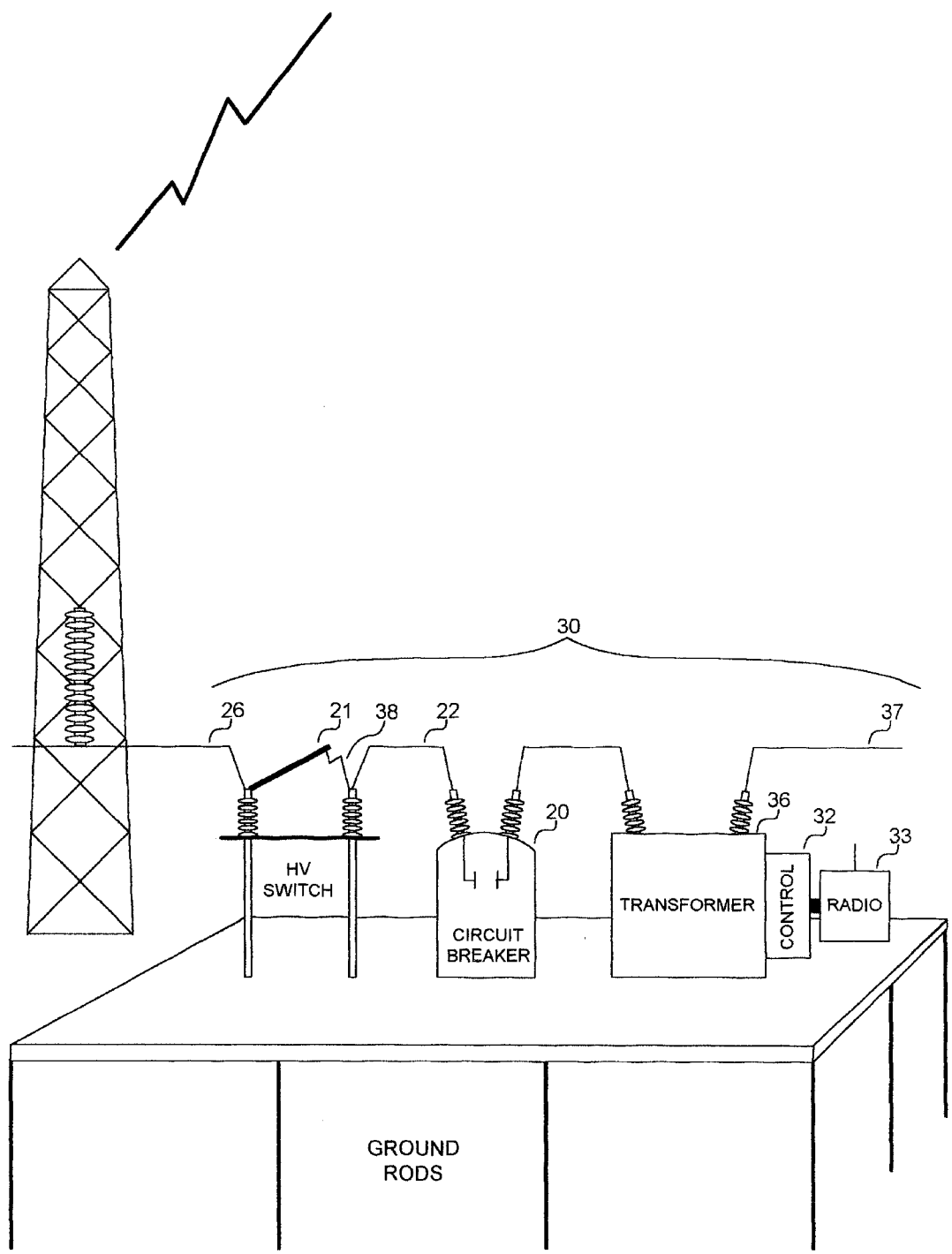
FIG. 3a shows interference sources from lightning and from the opening of a circuit breaker disconnect switch.

FIG. 3a shows a section of high voltage bus 26 at substation 30 being isolated by the opening of a circuit breaker 20. Distribution line power is provided by lines 37 (see FIG. 3b) from transformer 36. Typically with circuit breaker 20 open, the high voltage disconnect switch indicated by a line 21 is slowly opened, whereby charging current to the isolated section of bus 22 forms an electric arc which may typically extend to a foot in length before extinguishing. The bus 22 may typically be 100' in length. The arc will re-strike 120 times a second, just after each zero crossing of the high voltage wave, there being insufficient time at the zero crossing for the arc path to deionize. The combination effectively forms a crude arc driven radio transmitter with a fundamental component at the frequency where the bus section forms a quarter wavelength. The re-striking of the arc creates rich harmonics at higher frequencies with the electromagnetic field of the transient coupling to any loops such as the undesirable prior art loop 14 illustrated in FIG. 2. The arc may produce electromagnetic energy in the megawatt range, partially duplicating lightning (also shown in FIG. 3) in destructive power. It is a purpose of this invention to make IED's less susceptible to such transient energy by eliminating conducting loops.

In smaller substations, it may be desirable to make the connection to an external computer network via a telephone line. It is desirable to make the connection to a telephone line at some distance from the substation to avoid coupling damaging transient voltages from the substation into the telephone circuit. One prior art method of accomplishing this isolation was to use isolating transformers costing as much as $75,000.00.

Figure 3B:
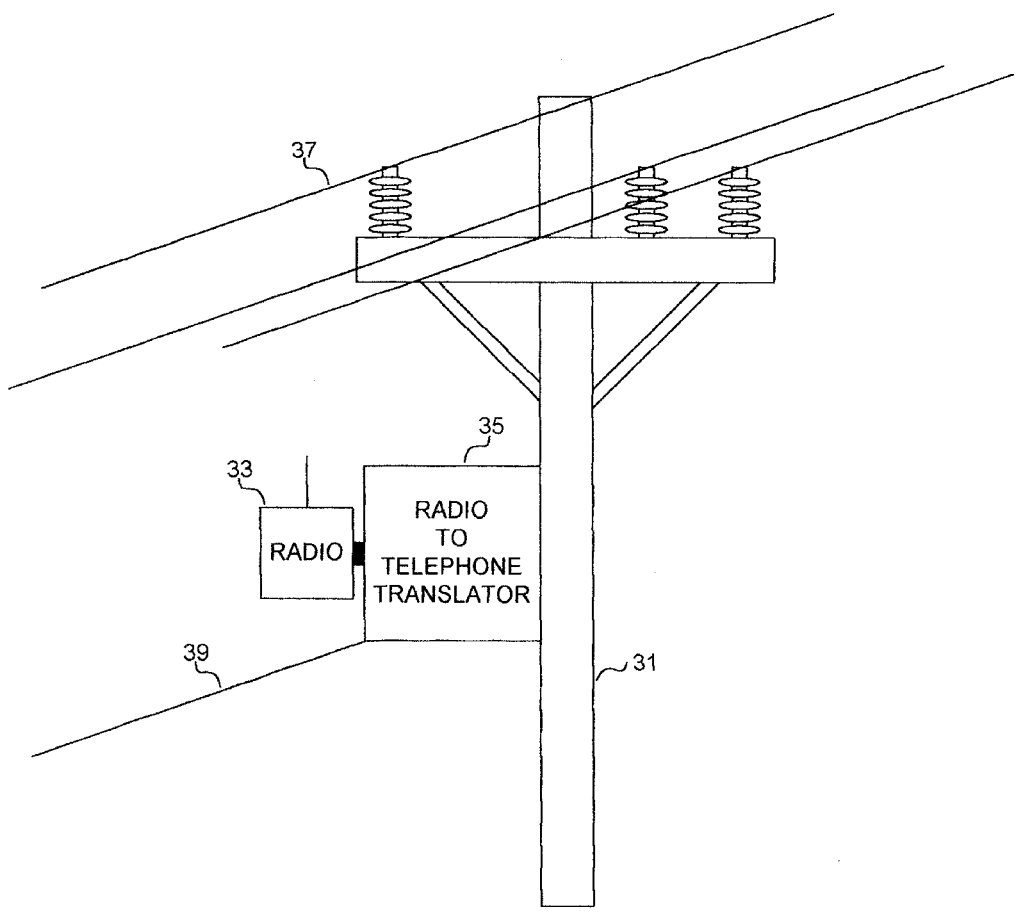
FIG. 3b shows lightning as well as a power arc forming high frequency interference circumvented by radio transmission to a power pole outside the substation.

FIG. 3b shows the use of a radio to telephone line translator mounted on a power pole 31 outside of a substation 30. Pole 31 carries lines 37 extending from substation distribution supply lines 37. This translator 35 is connected to transformer control 32 by radio 33 thereby eliminating the loop that might have been formed by bringing the telephone line 39 into substation 30.

One SLIM device is a regulator control as disclosed in the Application titled MULTIFUNCTION ADAPTIVE CONTROLS FOR TAPSWITCHES AND CAPACITORS cited above. Regulators are generally used in sets of three, one for each phase of a three phase circuit, either on a line leaving a substation or at an intermediate location in a power distribution line.

Figure 4:
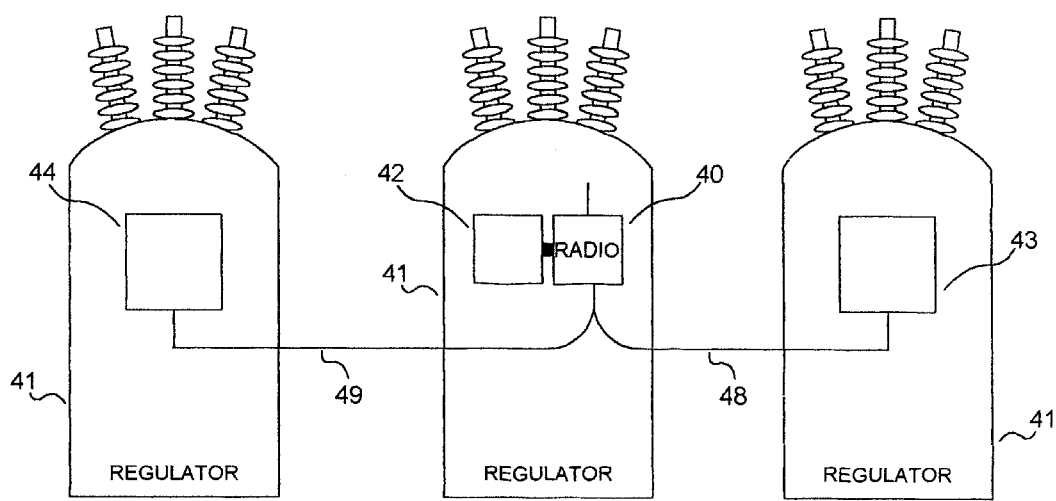
FIG. 4 shows a radio serving three regulators with communications to two of the regulators by fiber-optic cables.

FIG. 4 illustrates a radio 40 attached to a first regulator 41 control 42 for communicating intrinsically compressed binary coded data to end use points for the data. This form of radio has ports capable of digital communications via fiber optic cables 48 and 49 to regulator controls 43 and 44 respectively. This use of fiber optic cables as described in U.S. patent application Ser. No. 386,748, FIBER OPTIC TERMINATOR WITH ELECTRICAL INPUT/OUTPUT, referenced above, avoids conducting loops which are potentially formed by prior art use of conducting paths to controls 43 and 44.

ADVANTAGES OF THE INVENTION

A. Reduces the cost of use of packet radio by minimizing the length of the messages sent.

B. Makes messages secure, and messages are unusable at message terminating points without access codes.

C. Reduces the complexity and cost of IED's by sending the unaltered, intrinsically compressed operating code as the raw data message to end use locations.

D. Increases the operating speed of IED's by shortening the message handling program coding.

E. Averts the coupling of interfering electromagnetic transients into the associated system.

Although the inventive apparatus and methods disclosed herein are of particular value to the electric utility situations used in describing this invention, the invention is not limited to these uses.

I claim:

1. A communications system for an electric utility substation including in combination:
   a) intelligent electronic device (IED) means for control and protection of electric power equipment,
   b) program means for said IED means for using intrinsically compressed binary coded data;
   c) radio means containing buffering means for receiving and buffering packets of said data from said IED means, at first time criteria,
   d) an end use point for said data;
   e) said radio means further containing means for communicating said data in packets, at a second time criteria, to said end use point,
   f) program means at said end use point for extracting information from said data for use other than for control and protection of said electric power
   g) said radio mean and said IED means being physically combined to avert the coupling of interfering electromagnetic transients into said system.

2. A communications system for electric utility substations for communicating to and from end use points comprising in combination:
   a) intelligent electronic device (IED) means for control and protection of electric power equipment,
   b) program means for said IED means having data packets,
   c) radio device means containing means for sending, receiving and buffering said data packets from said IED means at a first time criterion,
   d) said radio device means further containing means for communicating said data packets to said end use points at a second time criterion, and
   e) program means at said end use points for extracting information from said data packets
   whereby the dangers of ground rise potential within a substation are averted.

3. A system as in claim 2 wherein said IED means and said radio device means are physically combined so as to avert the coupling of interfering electromagnetic transients into said communications system.

4. A communications system as in claim 2 wherein said radio device means comprise first and second radio device means:
   a) said second radio device means communicating data packets with said first radio device means,
   b) said second radio device means communicating said data packets to said end points, and
   c) said second radio device positioned so as to mitigate the dangers of ground rise potential within a substation.

5. A system as in claim 2 wherein said IED program means provide communications synchronous with the power frequency.

6. A communications system as in claim 2 wherein said data packets are intrinsically compressed by said IEDs.

7. A system as in claim 6 further including programming means at said end use points for extracting decompressed information.

8. A system as in claim 2 including telephone translator means for communicating data packets in and out of telephone lines.

9. A system as in claim 8 including second radio device means which obtains power from said telephone translator means
   thereby eliminating loops susceptible of coupling high frequency transients into communications systems.

10. A communications system including a plurality of regulator control intelligent electronic devices (IED)s communicating to and from end use points comprising in combination,
    a) said IEDs including program means having data packets,
    b) radio device means containing buffering means for receiving and buffering said data packets from said IEDs at first time criterion,
    c) program means for communicating said data packets by said radio device means from a first regulator control IED to said end use points using a second time criterion,
    d) fiber optic cable means connected to other than said first regulator control IED means so as to obtain data packets from said other regulator means, and
    e) program means at said end use points for extracting information from said data packets
    whereby a single radio device provides communications for a plurality of regulator controls.

11. A communications system for electric utility substations for communicating to and from end use points comprising in combination:

a) intelligent electronic device (IED) means for control and protection of electric power equipment, b) program means for said IED means having data packets, c) radio device means containing means for sending, receiving and buffering said data packets to and from said IED means at first time criterion, and d) said radio device means further containing means for communicating said data packets to said end use points at a second time criterion, whereby IEDs with a first time criterion are combined for communications with end use points using a second time criterion.

12. A system as in claim 11 wherein said IED program means provide communications synchronous with the power frequency.

13. A communications system as in claim 11 wherein said first radio device means and said IED are physically combined so as to avert the coupling of interfering electromagnetic transients into said communications system.

14. A method of providing communications for electric utility substations consisting of the steps of:

a) developing data packets in intelligent electronic device (IED) means within said substations, b) communicating said data packets between said IED means and first radio device means using first time criterion, and c) communicating said data packets between said first radio device means and end use points using a second time criterion, whereby the dangers of ground rise potential within a substation are averted.

15. A method as in claim 14 further including the step of extracting information from said data packets using program means provided at said end use points.

16. A method as in claim 14 including the step of buffering data packets in radio device means to accommodate differences in requirements of said first and second time criteria.

17. A method as in claim 14 including the step of utilizing said IED program means for providing communications synchronous with the power frequency.

18. A method as in claim 14 further including the step of physically combining said IED means with said radio device means whereby the coupling of interfering transients into said communication systems is averted.

19. A method as in claim 18 including the step of obtaining power for operation of said radio device means from said IED means thereby eliminating loops capable of coupling high frequency electrical transients into communications systems.

20. A method as in claim 14 including the step of developing intrinsically compressed data packets.

21. A method as in claim 20 for using program means at said end use points for extracting decompressed information from said compressed data packets.

22. A method as in claim 14 further including the steps of:

a) providing second radio device means located so as to avert dangers of ground rise potential, and b) communicating by wireless means between said first and second radio device means.

23. A method as in claim 22 further including the step of:

a) connecting said second radio device means to telephone translator means for communicating data packets in and out of telephone lines thereby averting the coupling of damaging transient voltages from substations into telephone circuits.

24. A method as in claim 23 wherein said second radio device means obtain power for operation from said telephone translator means thereby eliminating loops susceptible of coupling high frequency electrical transients into communications systems.

* * * * *